United States Patent [19]

Granberg

[11] Patent Number: 4,727,776
[45] Date of Patent: Mar. 1, 1988

[54] CHAIN SAW SHARPENING SYSTEM

[76] Inventor: Elof Granberg, 15 Harbor View Ct., San Rafael, Calif. 94901

[21] Appl. No.: 405,490

[22] Filed: Aug. 5, 1982

[51] Int. Cl.$^4$ .............................................. B23D 63/16
[52] U.S. Cl. ............................................ 76/25 A; 76/36
[58] Field of Search ...................... 76/25 A, 36, 37, 74

[56] References Cited

U.S. PATENT DOCUMENTS

| | | | |
|---|---|---|---|
| 2,901,834 | 12/1959 | Miller | 33/202 |
| 2,981,005 | 4/1961 | Moe | 33/178 |
| 3,354,753 | 11/1967 | Kennemore | 76/37 |
| 3,738,200 | 6/1973 | Granberg | 76/25 |
| 3,796,113 | 3/1974 | Granberg | 76/37 |
| 3,935,757 | 2/1976 | Granberg | 76/74 |
| 4,002,089 | 6/1977 | Granberg | 76/37 |
| 4,019,407 | 4/1977 | Penberthy | 76/37 |
| 4,242,926 | 1/1981 | Anton | 76/25 |

FOREIGN PATENT DOCUMENTS 1267431  9/1960  France.

*Primary Examiner*—Roscoe V. Parker
*Attorney, Agent, or Firm*—Townsend & Townsend

[57] ABSTRACT

A system for sharpening teeth on a saw chain includes both a motorized grinder and a separate gauge. The grinder includes a rotary grinding element and a height plate which is adjustable relative to the grinding element. The grinder may be used alone to sharpen the cutting edge of individual saw teeth and used in conjunction with the gauge to grind down the forward post of the saw tooth. Specifically, the gauge includes a plate and a flange along one edge of the plate, both the plate and the flange including an opening therein. By placing the flange of the gauge over at least two adjacent saw teeth, the upper surface of the flange defines a reference plane relative to the forward post of the teeth. The grinder may then be used in conjunction with the gauge to grind down the forward post to a preselected depth relative to said reference plane.

3 Claims, 5 Drawing Figures

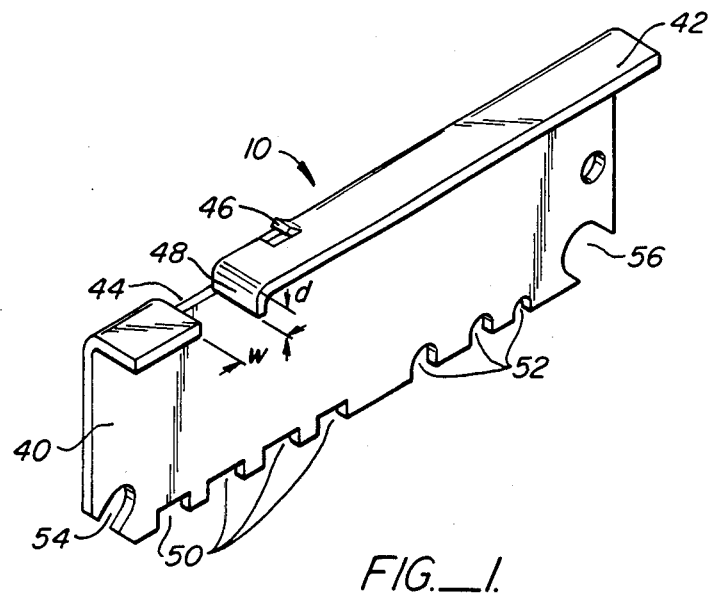
FIG._1.
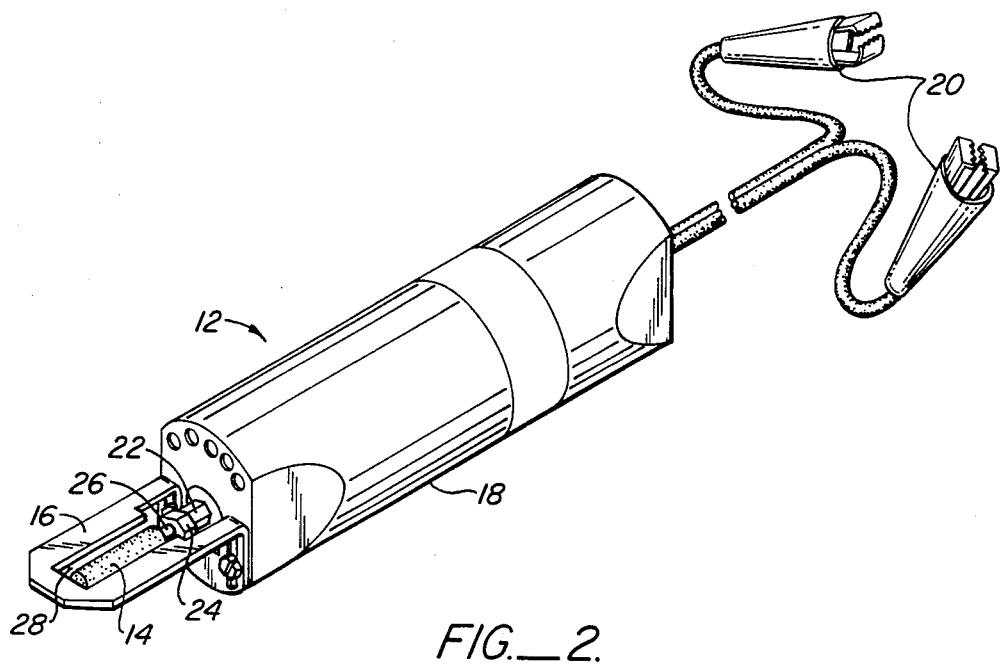
FIG._2.

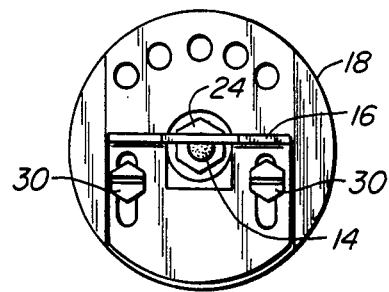
FIG._3.
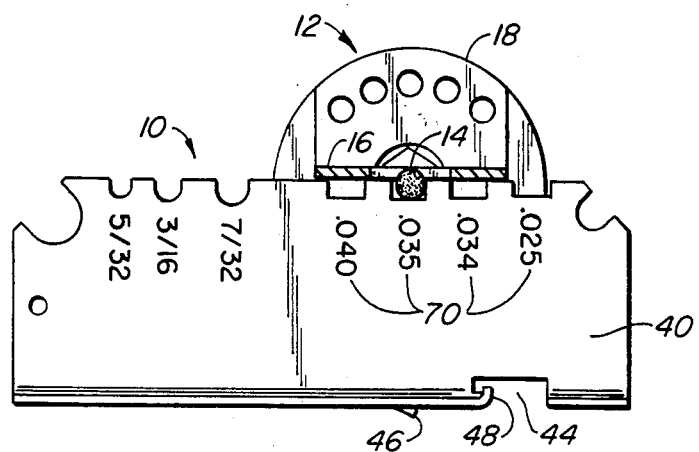
FIG._4.
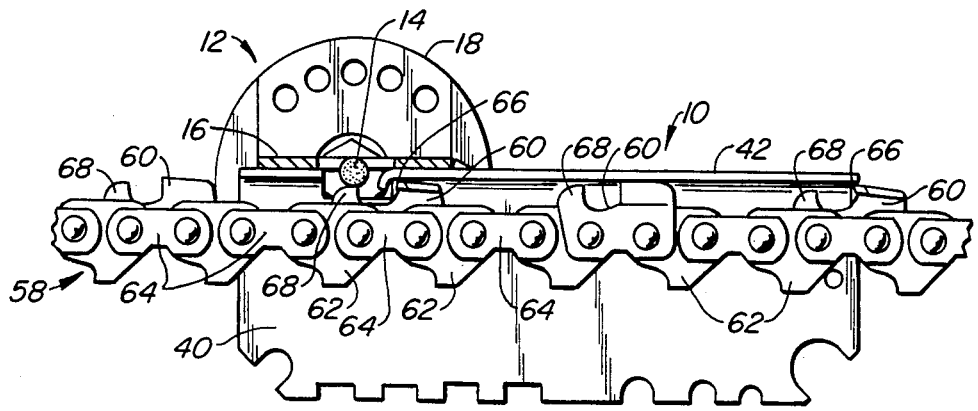
FIG._5.

CHAIN SAW SHARPENING SYSTEM

BACKGROUND OF THE INVENTION

1. Field of the Invention

The present invention relates generally to a system for sharpening chain saw teeth, and more particularly, to a system for both sharpening the cutting edge and grinding down the forward post of individual chain saw teeth.

2. Description of the Prior Art

Generally, each cutting tooth of a chain saw is provided with a forward post (also referred to as a depth gauge) at the front end of the tooth and a cutting edge at the rear end. For efficient operation, it is necessary both (1) that the cutting edge be sharpened at a particular angle relative to the axis of the chain and (2) that the proper vertical offset be provided between the forward post and the cutting edge. The particular angle and offset specified will vary depending on the type of chain saw and the type of chain saw blade.

In recent years, rotary grinders have found widespread application in sharpening the cutting edge of chain saw teeth at the desired angle. See, for example, U.S. Pat. Nos. 4,242,926; 4,019,407; 4,002,089; 3,738,200; and 3,354,753. In particular, U.S. Pat. No. 4,002,089 discloses a grinder having an adjustable plate which rests on the cutting edges of adjacent teeth of the chain saw blade while one cutting edge is being ground. The ability to adjust the relative height of the grinder wheel to the cutting edge allows wheels having differing diameters to be utilized. U.S. Pat. No. 3,738,200 discloses a grinder similar to that of U.S. Pat. No. 4,002,089, differing in the structure of the mechanism for adjusting the height of the grinder wheel relative to the adjustable plate. Grinders having adjustable plates for resting on the top of individual chain saw teeth are available from Granberg, Ltd., Richmond, CA.

SUMMARY OF THE INVENTION

The present invention comprises a system which utilizes a chain saw sharpening grinder to grind down the forward post as well as to sharpen the cutting edge of a chain saw tooth. The grinder includes a height plate which may be adjusted relative to a rotary grinding element and which serves as rest or support when the grinder is in use. The grinder is used to sharpen the cutting edge of a tooth by placing the height plate on the upper surface of the cutting edge and holding the grinder at the proper angle.

In addition to the rotary grinder, the system comprises a novel gauge which is adapted to rest on the cutting edges of at least two adjacent cutting teeth to define a reference plane for grinding down the forward post of one of the cutting teeth. The grinder is placed on the gauge in such a way that the height plate of the grinder is maintained at the level defined by the reference plane. Thus, by adjusting the position of the grinding wheel relative to the height plate, the forward post of the saw tooth can be ground down to a desired height.

The gauge is a flat plate having at least one straight edge and a relatively narrow flange joined at said one edge. A small opening is formed in both the flange and the plate so that the height plate of the grinder is able to rest on the flange with the grinding wheel projecting into the opening. To use the gauge, the flange is rested over the tops of at least two adjacent saw teeth with the flat plate portion of the guage resting alongside the teeth. The gauge is positioned so that the forward post of a saw tooth projects upward into the opening. By then positioning the grinder with its height plate resting on top of the flange and the grinding wheel lying inside the opening, the forward post may be ground down by moving the grinder back and forth. The height of the forward post is determined by the relative positions of the grinding wheel and the height plate. Conveniently, a desired forward post height can be achieved by adjusting the height plate relative to the grinding wheel using one of a plurality of slots formed in the gauge itself.

The novel features which are characteristic of the invention, as to organization and method of operation, together with further objects and advantages thereof will be better understood from the followng description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is an isometric view of the gauge of the present invention.

FIG. 2 is an isometric view of the grinder of the present invention.

FIG. 3 is a front elevational view of the grinder illustrating the height plate and height plate adjustment mechanism.

FIG. 4 illustrates the use of the gauge to adjust the relative positions of the grinding wheel and height plate.

FIG. 5 illustrates the use of the grinder and gauge in grinding the forward post of a saw tooth.

DESCRIPTION OF THE PREFERRED EMBODIMENT

The system of the present invention generally comprises a gauge 10 (FIG. 1) and a grinder 12 (FIG. 2). The grinder is a conventional saw chain sharpener having a rotary grinding element or wheel 14 and an adjustable height plate 16. The grinder 12 may be used alone to sharpen the cutting edge of an individual chain saw tooth in a wellknown manner. See, for example, U.S. Pat. Nos. 4,002,089 and 3,738,200, which describe chain saw sharpeners of the type having adjustable height plates, the disclosures of which are incorporated herein by reference. Using the gauge 10 of the present invention, the grinder 12 may also be used to grind down the forward post of an individual tooth, as will be described hereinafter.

Referring now to FIGS. 2 and 3, the grinder 12 comprises a body 18 having an internal motor (not shown). Typically, the motor will be a DC motor capable of being driven by a portable battery (not shown). Battery connector cables 20 are provided for connection to the battery. A mandrel 22 and a collet nut 24 together receive shaft 26 of the rotary grinding element 14. Thus, grinding elements may be easily replaced, and grinding elements having differing diameters can be inserted when desired.

The rotary grinding element 14 is located generally in an opening 28 formed axially in the height plate 16. In this way, the height plate 16 can be moved up and down, as viewed in FIGS. 2 and 3, relative to the grinding element 14 without interference between the grinding element and the height plate. Specifically, the relative positions may be adjusted by loosening screws 30 (FIG. 3) which attach plate 16 to the grinder 12. Slots 32 allow height plate 16 to move up and down approximately ¼ inch relative to the grinding element 14.

Referring now in particular to FIG. 1, the gauge 10 comprises a flat plate 40 having a flange 42 running along one edge thereof and forming approximately a right angle therewith. The shape of the gauge is not critical although it should have at least one substantially straight edge to accomodate the flange.

An opening 44 is formed in both the flange 42 and plate 40 to define a cavity for receiving the grinding element 14 of the grinder 12. The dimensions of the opening 44 are not critical, and it is necessary only that sufficient space be produced so that the grinding element A is able to project into the opening and move back and forth to grind down the forward post of the tooth, as will be described hereinabove. Generally, the width w of the opening should be greater than the diameter of the largest expected grinding element 14 by a factor of at least about 3, and preferably about 4 or more. The width w, however, should not exceed about one-half the width of the height plate 14 since the height plate will be required to rest on top of the opening as will be described in detail hereinafter. A width in the range from about one-half to one inch is suitable, preferably in the range from one-half to three-quarters inch. The depth d of the opening will generally be at least about one-half inch, although a greater depth is acceptable.

A stop member 46 is integrally formed in the flange 42 and projects upward (as viewed in FIG. 1) from the flange. A folded lip 48 is also formed in the flange and defines one end of the opening 44.

A plurality of slots 50 are provided along an edge of the plate 40. Each slot 50 has a predetermined depth corresponding to a desired height differential between the height plate 16 and the grinding wheel 14, and is used to adjust the grinder for use in grinding the forward post of the cuttng tooth. Conveniently, additional slots 52 will be provided for properly positioning the height plate 16 when the grinder 12 is used with different diameter grinding wheels 14 for sharpening the cutting edge of the saw tooth. Finally, slots 54 and 56 may be provided so that gauge 10 can be used as a wrench to tighten and loosen the mandrel 22 and collet 24, respectively.

Referring now to FIG. 5, a chain saw chain 58 typically comprises a plurality of cutting teeth 60 supported on chain links 62 and 64. Links 62 are specially formed to be received on the drive sprocket (not shown) of the chain saw and to be driven thereby. Each cutting tooth 60 comprises a cutting edge 66 and a forward post 68. The forward post 68 is slightly lower (as viewed in FIG. 5) than the cutting edge 66 and acts as a "depth gauge" in determining the amount of material cut as the tooth passes through the wood. For that reason, it is necessary that the difference in height between the forward post 68 and the cutting edge 66 be carefully maintained so that the chain saw will function properly.

As a tooth 60 wears, however, the cutting edge 66 is worn down more rapidly than the forward post 68. Moreover, because of the slight downward taper of the upper surface of the cutting edge 66, the height of the cutting edge diminishes as the tooth is sharpened. That is, the forward face of the cutting edge 66 is ground rearward (to the right in FIG. 5) which causes the uppermost point of the tooth to move downward relative to the post. In order to compensate for this wear, it is necessary that the forward post 68 of each tooth 60 be periodically ground down to maintain the proper difference in height between the forward post and the cutting edge 66.

Using the system of the present invention, this can be accomplished as follows. First, it is necessary to properly adjust the relative positions of the grinding element 14 and the height plate 16. Referring to FIG. 4, this may be accomplished by selecting the proper slot 50 corresponding to the desired depth. Conveniently, indicia 70 of the depth will be inscribed on the gauge 10 and it is necessary only to place the grinding element 14 into the slot and adjust the height plate 16 so that it lies flush against the edge of the gauge.

After the height plate 16 has been properly adjusted, the gauge 10 is placed over at least two of the saw teeth 60 so that the flange 42 of the gauge lies flush against the upper surfaces of the cutting edges 66. The gauge 10 is positioned so that the forward post 68 to be ground lies substantially in the middle of opening 44. By placing the grinder 12 with the grinding element 14 also in the opening 44 and the height plate 16 lying flush against the upper surface of the flange 42, the grinder may be used to grind down the forward post. Specifically, the grinder 12 will be moved back and forth with the height plate 16 sliding across the flange 42 and the grinding element 14 being held at the proper height at all times. The stop member 46 functions to prevent the grinding element from striking the edge of the opening. A second stop member may be provided on the opposite side of the opening to protect the opposite edge thereof, if desired. Even if the grinder does contact the flange, the folded lip 48 prevents the grinding wheel 14 from being damaged.

Although the best mode contemplated for carrying out the present invention has been herein shown and described, it will be appreciated that variations and modifications may be made without departing from what is regarded to be the subject matter of the present invention.

What is claimed is:

1. A system for sharpening individual saw teeth on a chain saw blade wherein each saw tooth comprises both a cutting edge and a forward post, said system including:

a grinder having a rotary grinding element and a height plate, said height plate being a unitary structure defining a plane which may be adjustably spaced-apart from the axis of the rotary grinding element; and a gauge comprising a plate having (1) at least one straight edge with a length greater than the spacing of two adjacent saw teeth and (2) a flange joined to said straight edge at substatially a right angle, said plate and said flange together having an opening with dimensions suitable for receiving the grinding element and for allowing the element sufficient space to grind down the forward post of the saw tooth, said flange having a stop member projecting from the flange surface opposite the plate and spaced apart from the opening by a distance chosen to prevent the rotary grinding element from contacting the plate as the grinder is moved across the forward post and lip adjacent the opening to protect the gauge from damaging the rotary grinding element;

whereby the grinder and the gauge may be used to grind down the forward post of a saw tooth to a preselected depth by first placing the gauge over at least two adjacent saw teeth so that the flange rests over the cutting edge of each tooth and the forward post to be ground is positioned in the opening, and thereafter moving the grinder across the gauge so that the height plate slidingly contacts the flange within the limits of the stop member and the rotary grinding element engages the forward post, the grinding depth being selected by adjusting the relative positions of the rotary grinding element and the height plate.

2. For use with a grinder having a rotary grinding element and a height plate, said height plate being a unitary structure defining a plane which may be adjustably spaced-apart from the axis of the rotary grinding element, a gauge plate for grinding down a forward post of a saw tooth on a chain saw blade, said saw tooth having both a forward post and a cutting edge, said gauge comprising:

a plate having (1) at least one straight edge with a length greater than the spacing of two adjacent saw teeth and (2) a flange joined to said straight edge at substantially a right angle, said plate and said flange together having an opening with a length in the direction of the straight edge greater than at least about one-half inch but not exceeding about one inch and a depth greater than at least about one-half inch, said flange having a stop member projecting from the flange surface opposite the plate and spaced apart from the opening by a distance chosen to prevent the rotary grinding element from contacting the plate as the grinder is moved across the forward post and a lip adjacent the opening to protect the gauge from damaging the rotary grinding element;

whereby the grinder and gauge may be used to grind down the forward post of a saw teeth to a preselected depth by first placing the gauge over at least two adjacent saw teeth so that the flange rests over at least two adjacent saw teeth so that the flange rests over the cutting edge of each tooth and the forward post to be ground is positioned in the opening, and thereafter moving the grinder across the gauge so that the height plate slidingly contacts the flange within the limits of the stop member and rotary grinding element engages the forward post, the grinding depth being selected by adjusting the relative positions of the rotary grinding element and the height plate.

3. A gauge as in claims 1 or 2, wherein the plate includes a plurality of slots along an edge other than the straight edge, the slots along having preselected depths corresponding to the desired adjustment of the rotary grinding element relative to the height plate which in turn correspond to grinding depths for the forward post.

* * * * *